United States Patent

[11] 3,618,786

[72] Inventor Bruce R. Fick
 Ballston Lake, N.Y.
[21] Appl. No. 788,402
[22] Filed Jan. 2, 1969
[45] Patented Nov. 9, 1971
[73] Assignee General Electric Company

[54] MATERIAL-HANDLING APPARATUS WITH END EFFECTOR FORCE RESOLVER AND FEEDBACK
5 Claims, 6 Drawing Figs.

[52] U.S. Cl. .................................................. 214/1 CM,
 214/141
[51] Int. Cl. .................................................. B25j 3/04
[50] Field of Search .......................................... 214/1
 RCM, 130

[56] References Cited
UNITED STATES PATENTS
3,168,203 2/1965 Gallistel .................. 214/1 RCM
3,263,824 8/1966 Jones ...................... 214/1 RCM
3,333,716 8/1967 Ziegler .................... 214/130

Primary Examiner—Gerald M. Forlenza
Assistant Examiner—George F. Abraham
Attorneys—Paul A. Frank, John F. Ahern, Julius J. Zaskalicky, Frank L. Neuhauser and Oscar B. Waddell ABSTRACT: Force feedback is provided to a master member from a slave member by forces sensing elements located at the end of the slave member which exerts the force and by actuators located at the master member responsive to the signals developed by the force-sensing elements.

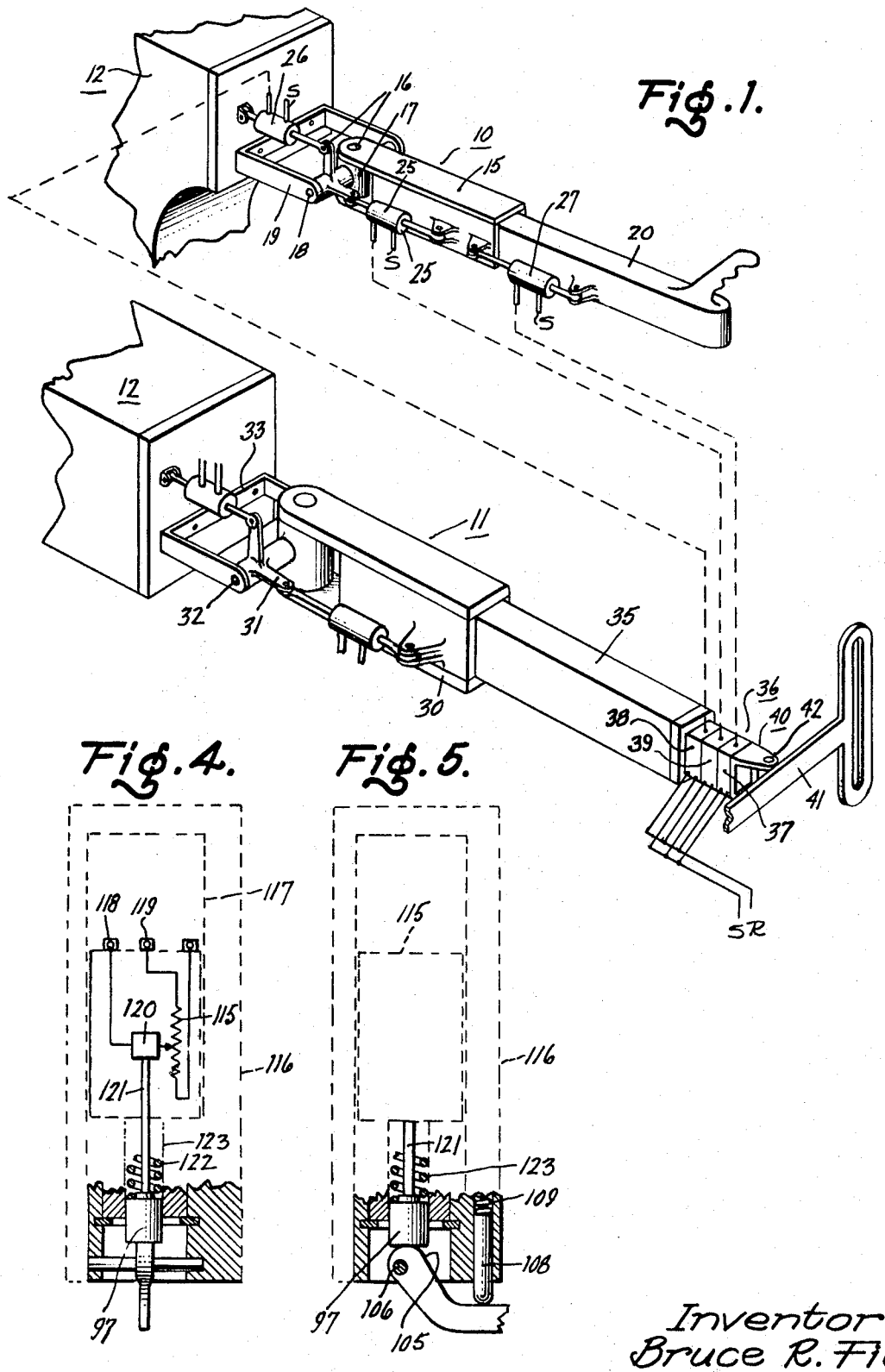

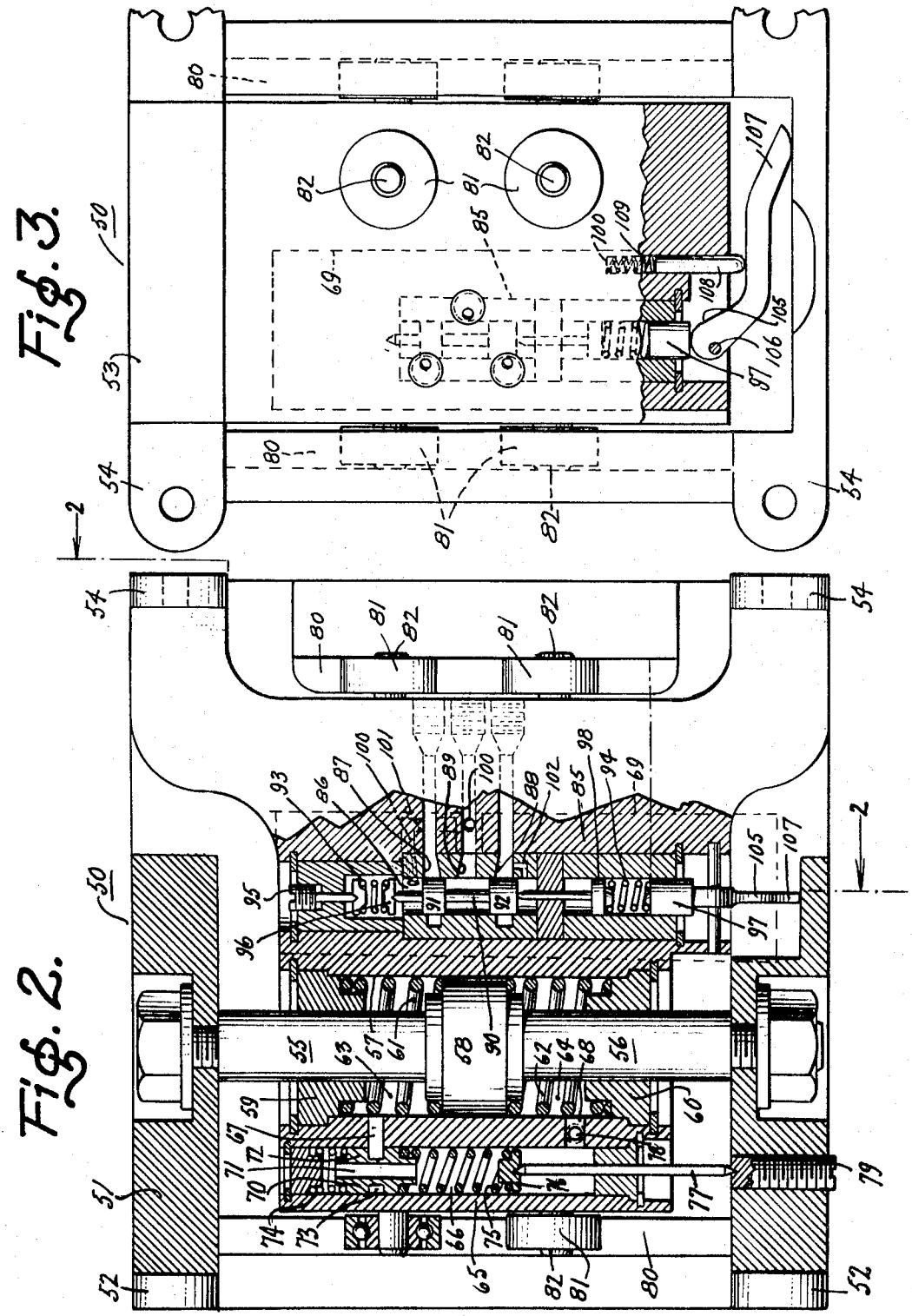

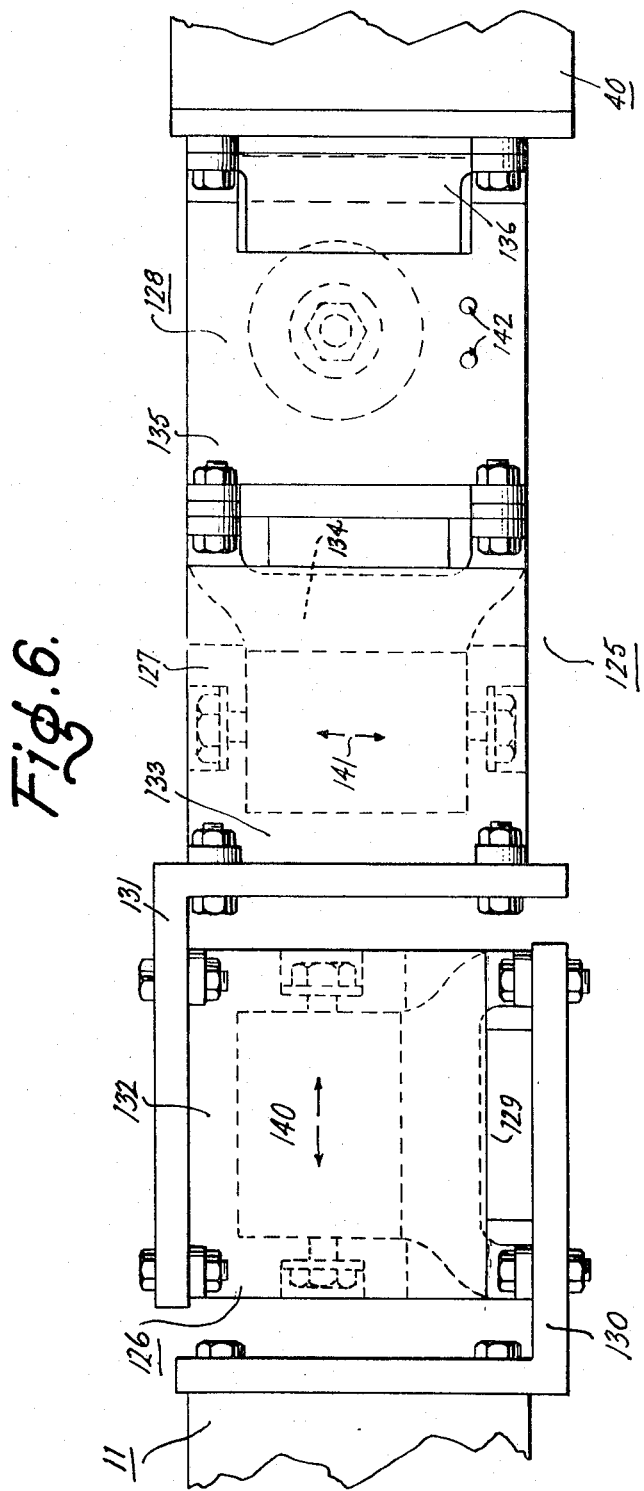

MATERIAL-HANDLING APPARATUS WITH END EFFECTOR FORCE RESOLVER AND FEEDBACK

The present invention relates, in general, to material-handling apparatus of the kind in which the movements of a control or master member produces corresponding movements amplified in respect to the force exerted thereby of a controlled or slave member, and in particular to such apparatus in which a portion of the force exerted by the slave member is reflected back to the master member to provide a sense of feel of the slave force being applied.

In some manipulators, the force applied by an end element, or an end effector attached thereto, on a slave member in a material-handling apparatus of the kind described above has been sensed by the provision of mechanical linkages connected between the slave member and the master member, for example, see the system shown and described in U.S. Pat. No. 3,333,716. In other manipulators, force feedback to the master element has been through the various actuators operating the articulated elements of the slave member.

In the case of systems making use of mechanical linkages, needless complexity is introduced into the kinematic structure of the manipulator and such systems lack flexiblity in application to provide force feedback which is in spatial correspondence with the force exerted by the slave member. The master control must be kinematically similar to the slave mechanism to obtain faithful indication of the forces acting on the slave end effector in a particular direction. In apparatus of the kind in which the feedback to the master member is provided through the joints of the slave member the static weight and inertia of the slave member is sensed along with the force being applied.

The present invention is directed to eliminate such shortcomings and limitations in prior art material-handling apparatus.

Accordingly, it is an object of the present invention to provide a force feedback control system for material-handling apparatus which is simple in structure and is flexible in application.

It is another object of the present invention to provide force feedback systems in remote controlled manipulators which are easily applied to existing apparatus.

It is also an object of the present invention to provide a force feedback system in material-handling apparatus which provides a better force feel in that static weight and inertia of the slave system are eliminated from the force feedback system.

It is a further object of the present invention to provide a force feedback system in material-handling apparatus in which the ratio of the force feedback can be readily charged.

In carrying out the objects of my invention in one illustrative embodiment thereof, there is provided a control member movable along at least one coordinate and a controlled member having an end element and connected thereto an end effector for applying a force to an object in response to movement of the control member. Force-sensing means are provided between the end element and the end effector for producing a signal representative of the magnitude and direction of force applied to the object by the controlled member in a direction parallel to the coordinate. Actuating means are provided at the control member which is responsive to the signal from the force-sensing means for producing a force to restrain the movement of the control member.

The novel features which are believed to be characteristic of the present invention are set forth in the appended claims. The invention itself, however, together with further objects and advantages thereof may best be understood by reference to the following description taken in connection with the accompanying drawings wherein:

FIG. 1 is a perspective view of an embodiment of my invention in which is shown a control member and a controlled member.

FIGS. 2 and 3 represent side and end views of a sensor for sensing the magnitude and direction of force applied along one coordinate by the end effector of a slave member.

FIGS. 4 and 5 represent side and end views of a modification of the embodiment of the sensor of FIGS. 2 and 3.

FIG 6 is a front view of a plurality of force sensors connected in series and each responsive to force along a particular coordinate for providing a plurality of signals representative of the force exerted along a plurality of coordinates.

Referring now to FIG. 1, there is shown a pair of members, a master or control member 10 and a slave or controlled member 11 which may be attached to a common frame 12. Movement of the master member 10 in azimuth, elevation or in extension produces a corresponding movement of the slave member 11 in azimuth, elevation or an extension. The particular means for producing such movements is not shown as such means are known in the art. The master member includes an element 15 which is pivotally supported at one end by pins 16 in vertically extending portions of cross-shaped journal 17 so as to permit the member 15 to move in azimuth. The horizontally extending portion of journal 17 in turn is pivotally supported on a shaft 18 attached to bracket 19 on frame 12 which permits the journal 17 to move in elevation about the shaft 18. Into the other end of the element 15, a second element 20 is telescoped. A plurality of piston and cylinder assemblies are provided on the master control to enable application of force feedback to the master control 10 along three mutually perpendicular directions. The piston and cylinder assembly 25 is connected between the element 15 and the journal 17 to enable application of a force in azimuth thereto. Similarly, the piston and cylinder assembly 26 is connected between the frame 12 and the journal 17 to enable application of force in elevation thereto. Similarly, the piston and cylinder assembly 27 is connected between the elements 15 and 20 to enable application of force in a direction along the axis of the elements 15 and 20.

The slave member 11 includes an element 30 which is pivotally supported at one end in a journal 31 which permits the member 11 to move in azimuth. The journal 31 in turn is pivotally supported on a shaft 32 mounted on bracket 33 attached to frame 12 which permits movement of the member in elevation about the shaft 32. Element 35 is slidable within element 30 to provide movement in extension thereof. At the other end of element 35 is secured a module 36 having three force-resolving elements 37, 38, and 39 to which is secured the end effector 40 shown as a bar 41 pivotable in a bracket 42. The structure of each of the force resolving elements and the manner of their connection together will be described in connection with FIGS. 2, 3, 4, 5, and 6. Each of the modules, that is, elements 35, 36, and 37, provides respective hydraulic pressure signal representative of the magnitude and direction of the force applied along a particular coordinate. The elements are set up to sense force along the coordinates, which are mutually perpendicular. The element 37 senses the component of force 37 that is applied by the end effector 40 to an object in a direction which would move the object in a direction along the axis of the slave member 11. The element 38 senses the component of force by the end effector 40 applied to an object in a direction which would move the object in the elevation direction. The element 39 senses the component of force that is applied by the end effector 40 to an object in a direction which would move the object in the azimuth direction. Each of the pressure signals from the force resolver elements are applied to a respective piston and cylinder actuators on the master control element to provide a respective force on the master control in a direction which opposes the movement of the master control which initiated the application of force by the slave end effector. The output pressure signal port of force resolver element 37 is connected to a control port on actuator 27. The output pressure signal port of force resolver element 38 is connected to a control port on actuator 26. The output pressure signal port on resolver element 39 is connected to a control port in actuator 25. Each of the elements 37, 38, and 39 has a pressure supply port designated by the symbol S to which fluid under pressure is supplied and each of the elements 37, 38, and 39 also has a drain port designated by the symbol R connected to the fluid return inlet of the pressure source. The control port on each of the actuators located on the rod side of the piston thereof is also connected to the high-pressure side of the pressure source. The force resolver elements when nulled, i.e., when no force is applied thereto, provide a pressure signal which is approximately one-half of the pressure of the source. The area of the piston on the rod side thereof is made one-half the area of the other side of the piston. Accordingly, when no force is being sensed by the force resolver no force is exerted by the corresponding piston and cylinder assembly. Each of the pressure signals are phased in respect to force exerted by each of the actuators on the control member to oppose the movement of the control member in the respective direction. Of course, the design of pressure characteristics of the force resolver elements and the piston area of the actuators is such that such reflected components of force are reduced in magnitude to provide an appropriate sense of feel to the operator manipulating the master control.

Referring now to FIGS. 2 and 3, there is shown an embodiment of a force resolver element 50 of the kind suitable for use in the apparatus of the kind described in FIG. 1. The force resolver element 50 includes a boxlike frame member 51 having four tabs 52 located on one side thereof for enabling attachment of the frame member to an end effector, to an end element, or to another force resolver element in a manner to be described below in connection with FIG. 6. The force resolver element 50 also includes a chassis member 53 movable with respect to the frame member 51. The chassis member 53 includes four tabs 54 for enabling attachment of the chassis member to another force resolver, to an end effector or to an end element. Support of the chassis member in the frame member is provided by means of a pair of coaxially aligned rods 55 and 56 which have end extending into a cylinder 57 in the chassis member 53. The other end of top rod 55 is affixed to the top portion of the boxlike frame 51. The other end of the bottom rod 56 is affixed to the bottom portion portion of the boxlike frame 51. The adjacent ends of the rods 55 and 56 are affixed to a piston 58 member slidable within the cylinder 57. A pair of end seals 59 and 60 are provided at each end of the cylinder 57 and coil springs 61 and 62 are provided between each of the end seals and a respective side of the piston 58. A force applied to the top of the frame member 51 along the axis of the support rods 55 and 56 to cause a movement of the frame member 51 with respect to the chassis member 53 produces a displacement between the members 51 and 53. The displacement is proportional to the force and is a function of the gradient of the springs 61 and 62.

Damping is provided to the movement of the frame member 51 with respect to the chassis member 53 by the provision of a fluid flow system which includes a valve 65 for controlling the rate of fluid flow from the chamber 63 on one side of the piston to the chamber 64 on the other side thereof. The valve 65 includes cylinder 66 which is provided with a duct 67 communicating with the chamber 63 and another duct 68 communicating with the other chamber 64. A spool 70 having a central bore 71 and a land 72, the central portion 73 of which is circumferentially slotted and provided with perforations enabling fluid to flow from the slotted portion through to the central bore 71 of the spool is provided in the cylinder. The spool 70 is supported at one end by spring 74 and is supported at the other end by another spring 75, one end of which bears against the cup 76 having an actuating rod 77. The remote end of the actuating rod 77 bears against the bottom portion of the boxlike frame member 51. An aperture adjusting screw 78 may be provided for controlling the cross section of the duct 68. The slot 73 in the spool registers with the upper duct 67 in the neutral position. With the arrangement described, large displacements of the frame member 51 with respect to the chassis member 53 produce a greater restriction in flow from the chamber 63 through the slotted section 73 into the cylinder 66 and thence into the lower chamber 64. Accordingly, damping is made proportional to the magnitude of the force acting on the frame member. A screw 79 may be provided in the bottom portion of the frame member 51 for adjustment of the damping.

To provide accurate sensing of the proper force vector by the force resolver and to permit movement of the frame member 51 and chassis member 53 with respect to one another only along a direction parallel to the axis of the rod members 55 and 56, that is, vertically up and down as seen in the drawing, each pair of opposed sides of the boxlike structure is provided with a slot or race 80. Cooperating with each of the slots are a pair of roller bearings 81 mounted on pins 82 secured to the chassis member for enabling movement of the roller bearings 81 in the slots with minimal frictional drag and for restricting the motion of the chassis member with respect to the frame member to an up-and-down direction as viewed in the plane of the drawings. Similarly, the other pair of opposed sides of the frame member 51 are provided with similar slots 80 and the chassis member 53 is provided with similar roller bearings 81 mounted on pins 82 for cooperation with the slots 80 for the purpose indicated. The structure described above senses force applied to the frame member 51 with respect to the chassis member 53 in the up and down direction and produces a displacement of the frame member with respect to the chassis member which is proportional to the magnitude of the force.

The displacement of the chassis member 53 with respect to the frame member 51 is converted into a pressure signal by means of the valve assembly 85 outlined by dotted box 69. The valve assembly 85 includes a cylinder portion 86 having a source port 87, a drain or return port 88 and a signal port 89. A spool 90 having a pair of lands 91 and 92 is mounted within the cylinder 86 and is supported in the neutral or null position by means of a pair of springs 93 and 94, one located at one end and the other located at the other end of the cylinder. One end of the springs 93 bears against a disk centered on the nulling screw 95 and the other end of the spring 93 through a disk 96 bears against the shaft of the spool 90. One end of the spring 94 bears against the sliding plunger 97 at the end of the cylinder and the other end bears against a disk 98 which in turn through a shaft and a seal joint bears against a land 92 of the spool 90. A feedback duct 100 with damping orifice 101 is provided from the signal port 89 to an end chamber between the land 91 and the nulling screw 95. A duct 102 for accommodating leakage around land 92 is also provided from the return port 88 to the other end chamber adjacent to land 92. Motion of the frame member 51 with respect to the chassis member 53 is communicated to the end study by means of an eccentric lever arm 105 which is pivoted about a point 106 on the chassis member 53 and the other end 107 of which bears against the frame member 51. A pin 108 and spring 109 arrangement included in a cylindrical opening 110 in the chassis member 53 provides a spring return for the eccentric lever arm 105.

For operation the valve 85 is initially nulled by means of screw 95. Signal pressure at port 89 when so nulled would lie between source pressure and drain pressure, preferably half way between. Motion of the frame upward increases the spring force supplied to the spool 90 by spring 94 which causes the spool to displace upward opening the supply port 87 and closing the drain port 85 so as to increase signal pressure at signal port 89. Signal pressure in turn is ported through the stabilizing orifice 101 in the duct 100 to the end of the spool adjacent thereto and increases until the signal pressure acting on that end of the spool balances the spring forces acting on the spool 90. The drain port or return 88 is ported to the opposite end of the spool 90 and through passageway 102 for the purpose of keeping the pressure from building up on this end of the spool due to leakage through the land 92 of the spool 90. Motion of the frame 51 downward decreases the spring force applied to the spool 90 and the output pressure at port 89 correspondingly decreases. When properly adjusted, the input or signal pressure at port 89 will vary approximately linearly from zero to the supply pressure as the frame moves from one extreme position to the opposite extreme position under reversing load. Spring bias force adjustments by means of screw 95 provides the necessary adjustment for counterbalancing any undesirable static forces and nulling the servo valve.

In place of the mechanohydraulic valve 85 for converting displacements of the frame member 51 with respect to the chassis member 53 into pressure signals, a potentiometer 115 may be provided in the force resolver element. The manner of connection of such potentiometer in the force resolver is shown in FIGS. 4 and 5 where the portion represented by dotted box 69 in FIGS. 2 and 3 is replaced by the dotted box 116 illustrated in FIGS. 4 and 5. In this figure is shown a board 117 on which is mounted the potentiometer 115 having a pair of end terminals 118 and 119 and a movable tap 120. A rod 121 is secured at one end to the center tap 120 of the potentiometer and at the other end is secured to the movable plunger 97 which bears against the cam surface of the lever 105. Spring return for the arrangement is provided by a spring 122 included between the upper base of the cylinder 123 and the upper surface of the stud 97. Accordingly, displacements of the chassis member 53 with respect to the frame member 51 produce a change in resistance between the center tap 120 and either one of the end terminals 118 and 119. Of course with the sensors shown in FIGS. 4 and 5 electrohydraulic servo valves would be provided for converting the electrical signals to pressure signals for use with actuators respond FIG. 1. The electrical signals from sensors of the kind shown in FIGS. 4 and 5 could be used directly in the system of FIG. 1 if the system were provided with actuators which respond to electrical signals to produce torque.

Referring now to FIG. 6, there is shown an assembly 125 of three force resolver units each of which may be of the kind illustrated in connection with FIGS. 2 and 3 or FIGS. 4 and 5 and which may represent the composite force resolver or module 36 shown in FIG. 1 for sensing a force applied at an end effector into three components along directions which are mutually perpendicular. Force resolver element 126 is oriented to sense the component of force along the axis of the boom 11 of FIG. 1, as indicated by arrow 140. The force resolver element 127 is arranged to sense motion perpendicular to the boom and in an up-and-down or elevation direction as indicated by arrow 141. The force resolver element 128 oriented to sense the component of force applied by the end effector in a direction perpendicular to the boom and in a direction also perpendicular to the plane of the drawing, as indicated by arrows 142. The chassis member 129 of the force resolver element is secured to the bottom portion of an L-shaped frame member 130, the side portion of which is attached to the end element 35 of slave member 11. Another L-shaped member 131 is provided having the top portion thereof secured to the taps of the frame member 132 of the force resolver element 126 and the side portion of the L-shaped member 131 is secured to the frame member 133 of the force resolver element 127. The chassis portion 134 of the force resolver element 127 is secured to the frame portion 135 of the force resolver element 128. The chassis portion 136 of the force resolver element 128 in turn is secured to the end effector 40. Thus, the individual force resolver elements are connected in series and are provided with the proper orientation to sense forces along three mutually perpendicular axes. The pressure signals, or in the event that the assembly of FIGS. 4 and 5 is used, electrical signals are then conducted and conveyed to appropriate force feedback actuators on the master control to provide force feedback thereto as described in connection with FIG. 1.

While I have shown particular embodiments of my invention, it will, of course, be understood that I do not wish to be limited thereto since many modifications may be made in the structural arrangement shown and the instrumentalities employed. I contemplate by the appended claims to cover any such modifications as fall within the true spirit and scope of the invention.

What I claim as new and desire to secure by Letters Patent of the United States is:

1. A control system comprising
   a support member,
   a control member one end of which is pivotally connected to said support member and the other end of which is movable with respect to said support along a plurality of coordinates,
   a controlled member, one end of which is pivotally connected to said support member and the other end of which is movable with respect to said support along said plurality of coordinates,
   means responsive to the orientation of said control member for producing an identical orientation with respect to said support of said controlled member,
   an end effector connected to the other end of said controlled member for applying a force to an object in response to the movement of said other end of said control member,
   force-sensing means connected between said end element and said end effector for producing a plurality of signals, each signal corresponding in magnitude and direction to the respective component of force applied to said object parallel to a respective coordinate, and
   a plurality of actuators each connected to said control member and responsive to a respective one of said signals for producing a force corresponding to the force which produced the signal to restrain the movement of said control member in a direction parallel to the corresponding component of applied force.

2. The combination of claim 1 in which said coordinates are three in number and mutually perpendicular.

3. The combination of claim 1 in which said force-sensing means includes a plurality of force resolvers, each force resolver including a pair of members which become displaced in accordance with the component of force applied along a respective direction thereof and a signal-generating means responsive in polarity and magnitude to the direction and magnitude of the displacement of said members.

4. The combination of claim 3 in which said force resolvers are connected in series between said end element and said end effector.

5. The combination of claim 3 in which said coordinates are three in number and mutually perpendicular.

* * * * *